US011082951B2

(12) United States Patent
Zhang et al.

(10) Patent No.: US 11,082,951 B2
(45) Date of Patent: Aug. 3, 2021

(54) DYNAMICALLY CONTROLLED UE OUTPUT AS A FUNCTION OF DUTY CYCLE AND PROXIMITY SENSOR INFORMATION

(71) Applicant: AT&T Intellectual Property I, L.P., Atlanta, GA (US)

(72) Inventors: Yizhe Zhang, Austin, TX (US); Yupeng Jia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/145,690

(22) Filed: Sep. 28, 2018

(65) Prior Publication Data

US 2020/0107296 A1  Apr. 2, 2020

(51) Int. Cl.
*H04W 72/02* (2009.01)
*H04W 48/12* (2009.01)
(Continued)

(52) U.S. Cl.
CPC ......... *H04W 72/02* (2013.01); *H04W 48/12* (2013.01); *H04W 52/0212* (2013.01); *H04W 52/146* (2013.01)

(58) Field of Classification Search
CPC ......... H04W 52/367; H04W 72/0446; H04W 72/046; H04W 52/146; H04W 52/346;
(Continued)

(56) References Cited

U.S. PATENT DOCUMENTS 4,639,914 A   1/1987  Winters
5,559,790 A   9/1996  Yano et al.
(Continued)

FOREIGN PATENT DOCUMENTS

CN   104853425 A   9/2018
EP   3107336 B1    5/2018
WO   2008144274 A2  11/2008

OTHER PUBLICATIONS

Alsharif, Mohammed H., et al. "How to make key 5G wireless technologies environmental friendly: A review." Trans Emerging Tel Tech. 2018;29:e3254. https://doi.org/10.1002/ett.3254. 2017. 32 pages.

(Continued)

*Primary Examiner* — Asad M Nawaz
*Assistant Examiner* — Najeeb Ansari
(74) *Attorney, Agent, or Firm* — Amin, Turocy & Watson, LLP

(57) ABSTRACT

Adjusting the power of an uplink transmission based on duty cycle and proximity sensor information is disclosed. The duty cycle represents the ratio of uplink transmission time slots to downlink transmission time slots in a defined period of time. Thus, if during a time period the percentage of uplink transmission is low, then not as much of a power reduction is implemented. If the percentage of uplink transmission is high, then an increased power reduction can be implemented to ensure that the MPE is not exceeded. This duty cycle information can be paired with proximity sensor data to determine whether a person is present. If no person is present, then no power reductions need to be implemented, and if a person is present, then various levels of power reduction can be implemented based on the duty cycle.

20 Claims, 10 Drawing Sheets

(51) Int. Cl.
*H04W 52/02* (2009.01)
*H04W 52/14* (2009.01)

(58) Field of Classification Search
CPC .. H04W 72/0413; H04W 88/02; H04W 52/34
See application file for complete search history.

(56) References Cited

U.S. PATENT DOCUMENTS

| | | |
|---|---|---|
| 6,697,634 B1 | 2/2004 | Hayashi |
| 8,009,595 B2 | 8/2011 | Lindoff et al. |
| 8,514,771 B2 | 8/2013 | Das et al. |
| 8,543,152 B2 | 9/2013 | Sutivong et al. |
| 8,634,360 B2 | 1/2014 | Liu et al. |
| 8,712,461 B2 | 4/2014 | Yavuz et al. |
| 8,743,761 B2 | 6/2014 | Ma et al. |
| 8,929,880 B2 | 1/2015 | Ratasuk et al. |
| 8,989,053 B1 | 3/2015 | Skaaksrud et al. |
| 9,220,122 B2 | 12/2015 | Turtinen et al. |
| 9,814,073 B2 | 11/2017 | Barbieri et al. |
| 9,867,027 B2 | 1/2018 | Chuang |
| 2003/0027587 A1 | 2/2003 | Proctor |
| 2007/0217348 A1 | 9/2007 | Tapia et al. |
| 2012/0071195 A1* | 3/2012 | Chakraborty ........ H04B 1/3838 455/522 |
| 2012/0142291 A1* | 6/2012 | Rath ................ H04B 7/0602 455/127.1 |
| 2013/0169348 A1* | 7/2013 | Shi ................. H04B 1/3838 327/517 |
| 2014/0038588 A1* | 2/2014 | Ljung .............. H04W 52/0216 455/422.1 |
| 2014/0329552 A1* | 11/2014 | Gopalakrishnan ..... H01Q 1/243 455/522 |
| 2015/0349917 A1 | 12/2015 | Skaaksrud |
| 2016/0353440 A1* | 12/2016 | Lee ................. H04W 72/0453 |
| 2017/0134883 A1 | 5/2017 | Lekutai |
| 2017/0230123 A1* | 8/2017 | Lagnado ............ H04B 17/102 |
| 2017/0280347 A1 | 9/2017 | Skaaksrud |
| 2018/0167897 A1* | 6/2018 | Sampath ........... H04W 52/365 |
| 2019/0200365 A1* | 6/2019 | Sampath ........... H04W 72/085 |
| 2019/0222326 A1* | 7/2019 | Dunworth ........... H04B 17/13 |

OTHER PUBLICATIONS

Lopez-Perez, David, et al. "Towards 1 Gbps/UE in Cellular Systems: Understanding Ultra-Dense Small Cell Deployments." arXiv:1503.03912v1 [cs.NI] Mar. 12, 2015. 23 pages.

Zuniga, Marco Antonio, et al. "D-1.1—Report on Environmental and Platform Models." Rely on IT (2013). http://relyonit.eu/fileadmin/user_upload/D-1.1.pdf. 60 pages.

Usman, Muhammad, et al. "Towards Energy Efficient Multi-hop D2D Networks using WiFi Direct." GLOBECOM 2017-2017 IEEE Global Communications Conference. IEEE, 2017. 8 pages. https://www.researchgate.net/profile/Muhammad_Usman29/publication/319155114_Towards_EnergyEfficient_Multihop_D2D_Networks_using_WiFLDirect/links/59958de7a6fdccabbdd3f6a2/Towards-Energy-Efficient-Multi-hop-D2D-Networks-using-WiFi-Direct.pdf.

* cited by examiner

400

| FORMAT | SYMBOL NUMBER IN SLOT | | | | | | |
|---|---|---|---|---|---|---|---|
| 0 | D | D | D | D | D | D | D |
| 1 | U | U | U | U | U | U | U |
| 2 | U | U | X | X | D | D | D |
| 3 | D | D | D | D | U | U | U |
| 4 | U | U | U | U | U | D | D |
| 5 | U | U | D | D | D | D | D |
| 6 | D | X | X | U | U | U | U |

402 → FORMAT row header
404 → row 1
406 → row 2
408 → row 3

DYNAMICALLY CONTROLLED UE OUTPUT AS A FUNCTION OF DUTY CYCLE AND PROXIMITY SENSOR INFORMATION

TECHNICAL FIELD

The present application relates generally to the field of mobile communications and, for example, to adjusting the power of an uplink transmission based on the duty cycle and proximity data from a proximity sensor in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 4 illustrates an example table showing uplink formats and slot assignments in accordance with various aspects and embodiments of the subject disclosure.

DETAILED DESCRIPTION

Figure 1:
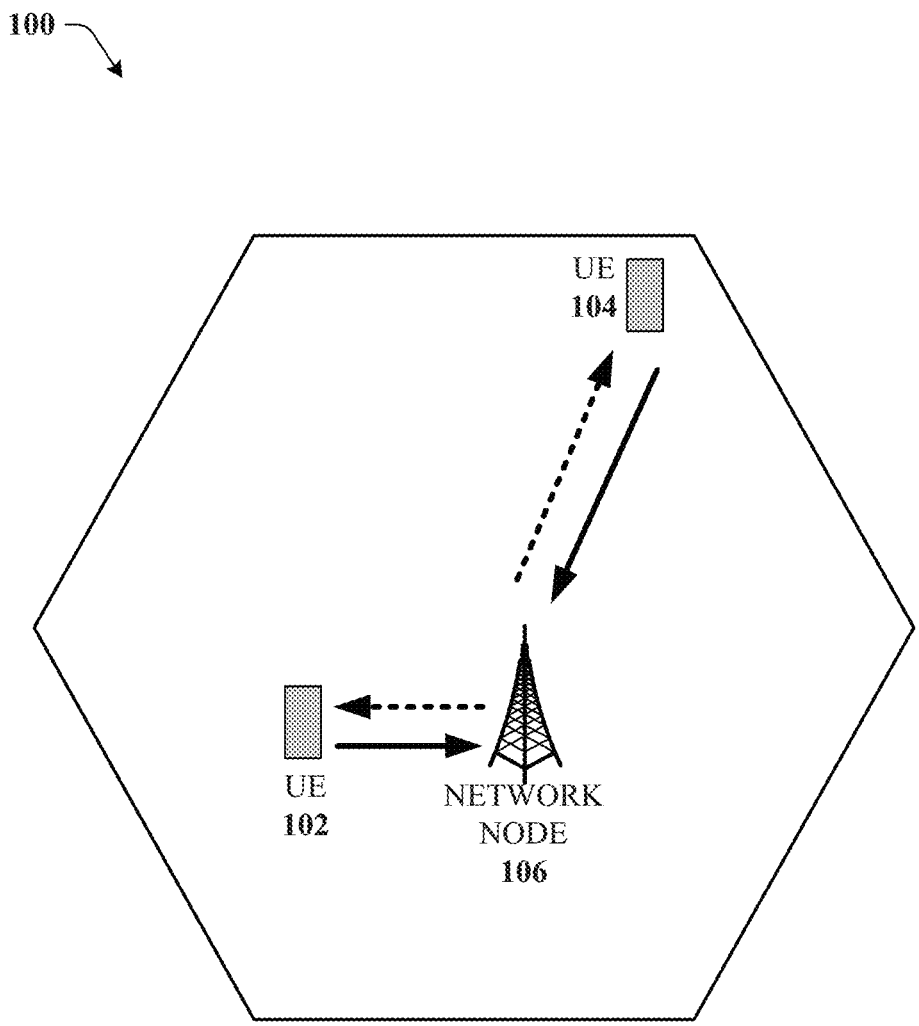
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for reducing the power of an uplink transmission based on duty cycle and proximity sensor information. The power reduction can be applied to the uplink transmission in order to ensure that the maximum permissible exposure (MPE) of radiofrequency energy is not exceeded for any users nearby the mobile device. The duty cycle represents the ratio of uplink transmission time slots to downlink transmission time slots in a defined period of time. Thus, if during a time period the percentage of uplink transmission is low, then not as much of a power reduction is implemented. If the percentage of uplink transmission is high, then an increased power reduction can be implemented to ensure that the MPE is not exceeded. This duty cycle information can be paired with proximity sensor data to determine whether a person is present. If no person is present, then no power reductions need to be implemented, and if a person is present, then various levels of power reduction can be implemented based on the duty cycle.

In various embodiments a user equipment device can comprise a processor and a memory that stores executable instructions that, when executed by the processor, facilitate performance of operations. The operations can include determining a duty cycle of a transceiver for a period of time, wherein the duty cycle is a ratio of an uplink transmission time period to a downlink transmission time period. The operations can also include receiving proximity data from a proximity sensor, wherein the proximity data indicates that an object is within a defined distance from the proximity sensor. The operations can also include applying a power adjustment to reduce a transmission power of an uplink transmission, wherein a magnitude of the power adjustment is a function of the duty cycle and the proximity data.

In another embodiment, a method can comprise determining, by a user equipment device, a percentage of time in a time period that the user equipment is scheduled to transmit. The method can also comprise determining, by the user equipment device, based on proximity data received from a proximity sensor, that an object is within a defined proximity of the proximity sensor. The method can also comprise applying, by the user equipment device, a power backoff that reduces a transmission power of the user equipment device during the time period, wherein a magnitude of the power backoff is based on the percentage and the proximity data In another embodiment, non-transitory machine-readable storage medium, comprising executable instructions that, when executed by a processor of a relay node device, facilitate performance of operations. The operations can comprise determining a percentage of time in a time period that a user equipment is scheduled to transmit. The operations can comprise determining, based on proximity data received from a proximity sensor, a distance of an object from the proximity sensor. The operations can comprise reducing a transmission power of an uplink transmission during the time period, wherein a magnitude of a power reduction is correlated to the percentage and the distance of the object to the proximity sensor.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream.

The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In some embodiments the non-limiting term radio network node or simply network node is used. It refers to any type of network node that serves UE and/or connected to other network node or network element or any radio node from where UE receives signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments the non-limiting term user equipment (UE) is used. It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc.

The embodiments are described in particular for NR. The embodiments are however applicable to any RAT or multi-RAT system where the UE operates using multiple carriers e.g. LTE FDD/TDD, GSM/GERAN, Wi-Fi, WLAN, WiMax, CDMA2000 etc.

The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Note that the embodiments disclosed herein apply equally for Multi RAB (radio bearers) on some carriers (that is data plus speech is simultaneously scheduled).

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, UE 102 and 104 can apply power reductions to uplink transmissions to network node 106 in order to meet Federal Communications Commission (FCC) requirements regarding Specific Absorption Rate (SAR) and Maximum Permissible Exposure (MPE), while optimizing 5G throughput, cell coverage, and reducing the overall cost of network deployment, and mitigating millimeter wave (mmWave) thermal issues.

Operators are now deploying 5G mmWave frequency bands. For the 5G devices, they will camp on mmWave cell with LTE as anchor cell. A mobile device (e.g., UE 102 and 104) may support both mmWave and LTE frequency bands while operating at the same time. According to FCC human exposure compliant requirements, SAR testing is required for sub 6 GHz device and MPE is required for frequencies higher than 6 GHz. 5G devices are expected to be compliant with both SAR and MPE at the same time. LTE SAR at the maximum of FCC specification is 1.6 mW/g. FCC MPE limit is 1.0 mW/cm$^2$ for frequency range 1.5 GHz-100 GHz. Traditionally, this limitation is challenging for the transmitter design of a device. In order to meet combined MPE requirement, devices may need to apply a power backoff or turn off 5G transmit when device is in close distance to user.

SAR relates to the measure of the rate at which energy is absorbed by the human body when exposed to a radio frequency (RF) electromagnetic field. It can also refer to absorption of other forms of energy by tissue, including ultrasound. It is defined as the power absorbed per mass of tissue and has units of watts per kilogram (W/kg). The MPE is the highest power or energy density (in W/cm$^2$ or J/cm$^2$) of a light source that is considered safe. MPE can be derived from SAR.

When a device (e.g., UE 102 or 104) is at DL/UL 50% duty cycle, it is transmitting half time and receiving half of the time. When device is at UL/DL 25% duty cycle, it is transmitting ¼ of the time and receiving ¾ of the time. The lower the duty cycle, the less total RF energy is emitted, and thus the lower the likelihood of exceeding the MPE. If there is nobody present however, the power does not need to be reduced. If somebody is present however, the power can be proportional to the duty cycle—specifically proportional to the ratio of the uplink to downlink transmission time. As the uplink percentage increases, the magnitude of the power reduction can correspondingly increase.

The duty cycle ratio can be communicated by the network node 106 to the UE 102 and 104 using downlink control information that specifies what the slot format will be for a defined period. For each slot format, there may be up to 14 subcarrier symbols, each of which may be a downlink symbol or uplink symbol. The duty cycle is the ratio of the uplink symbols to downlink symbols. There may be up to 56 different formats depending on the needs of the communications between the UE 102 and 104 and the network node 106. The network node 106 can indicate which of the slot formats is to be used for a subsequent time period in downlink control information, and then the UE 102 or 104 can apply the backoff as a function of the slot format's duty cycle and the proximity data from a proximity sensor on the UE 102 and 104.

In an embodiment, the network node 106 can determine which slot format to use based on information received from the UE 102 or 104 about the applications active on the device, or the expected uplink transmission requirements, or based on the active packet data protocol context. For instance, if there is an expected uplink transmission, the UE 102 or 104 can transmit that information to the network node 106 via radio resource control signaling, and the network node 106 can take that information, about whether the next time period will be uplink dominant or downlink dominant when selecting the slot format to be used.

Figure 2:
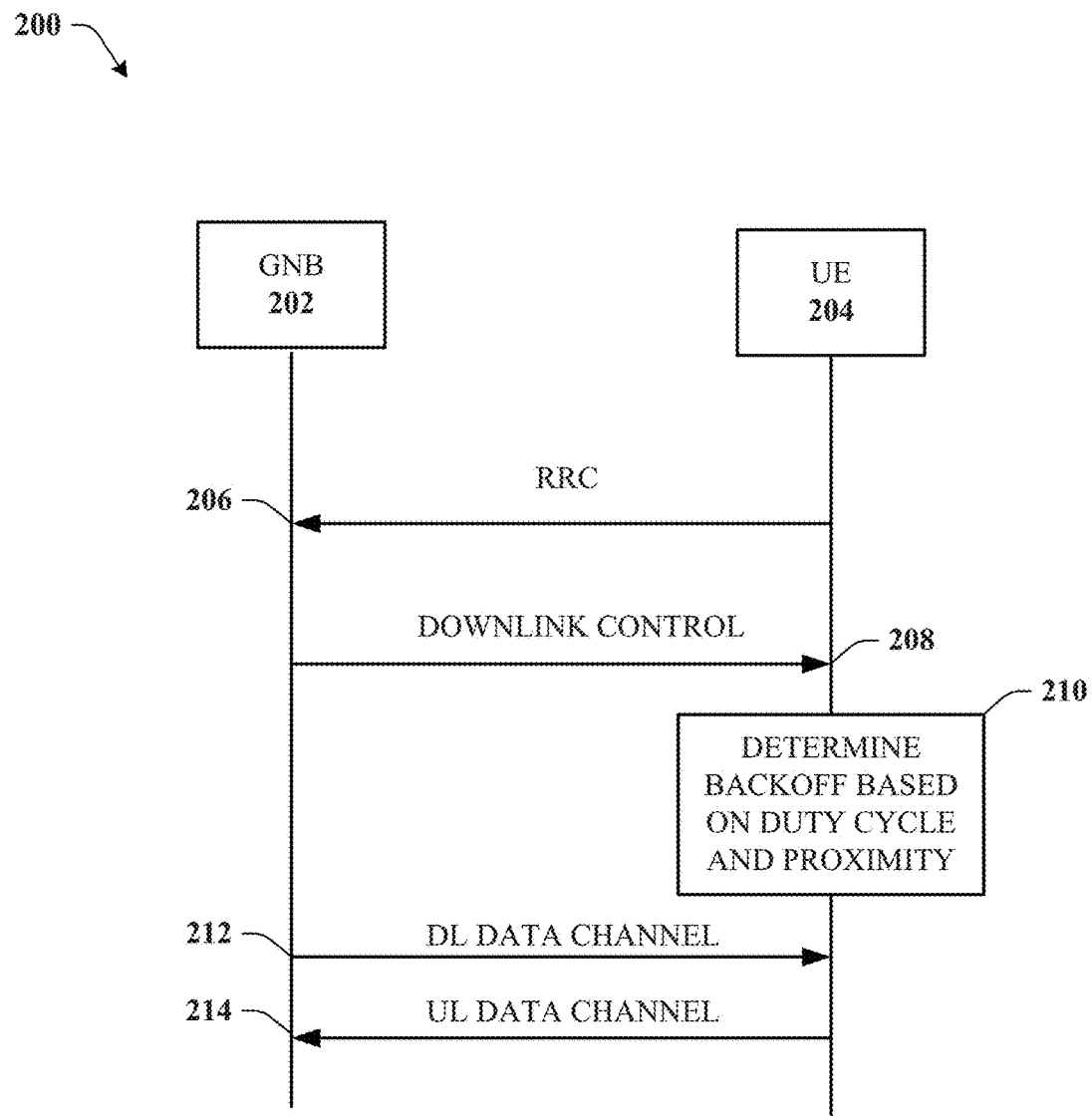
FIG. 2 illustrates an example message sequence chart in accordance with various aspects and embodiments of the subject disclosure.

Turning now to FIG. 2, illustrated is an example message sequence chart 200 in accordance with various aspects and embodiments of the subject disclosure.

In an embodiment, the UE 204 can send an RRC message to the GNB 202 indicating which applications are active or which PDP contexts are active, or what the expected uplink to downlink requirements will be for a future time period. Based on that, and other information, GNB 202 can transmit downlink control information 208 to UE 204 which indicates a slot format to be used for the subsequent time period for DL data channel 212 and UL data channel 214, and UE 204, at 210, can use the slot format selected to determine what the uplink to downlink ratio will be, and then also based on the proximity data from a proximity sensor, determine an appropriate power backoff/reduction amount, and apply the power backoff to UL data transmission via UL data channel 214.

Figure 3:
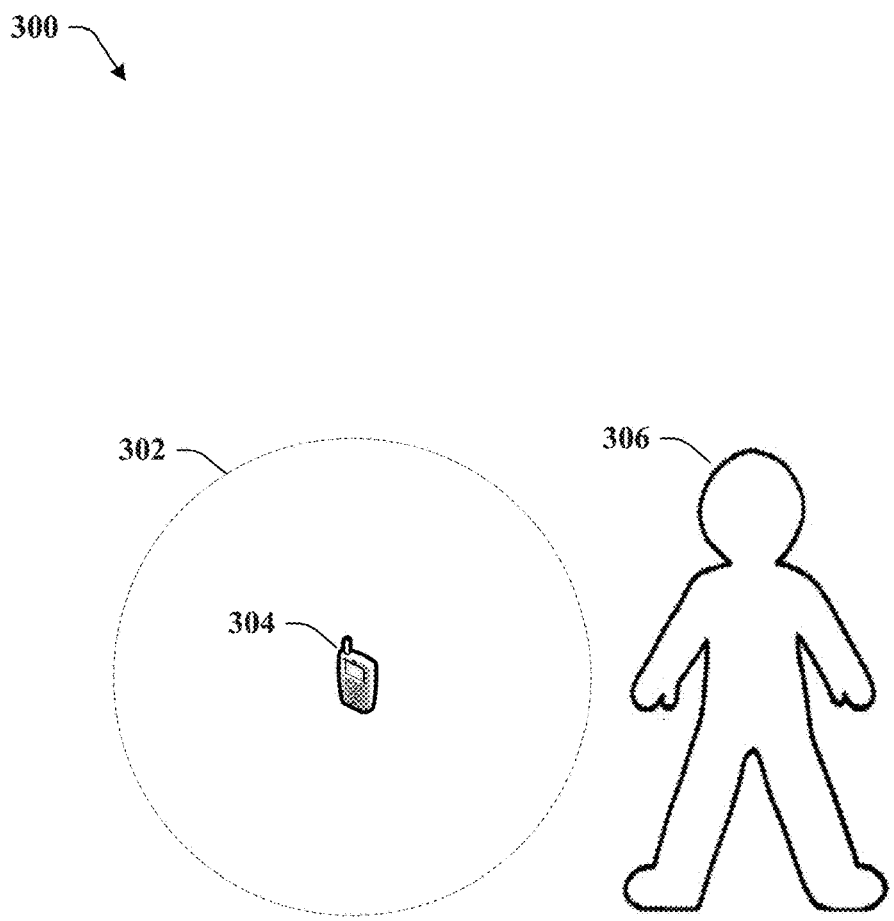
FIG. 3 illustrates an example block diagram of a mobile device with a proximity sensor in accordance with various aspects and embodiments of the subject disclosure.

Turning now to FIG. 3, illustrated is an example block diagram of a mobile device 304 with a proximity sensor in accordance with various aspects and embodiments of the subject disclosure.

The proximity sensor on UE 304 can determine when an object 306 (e.g., a person, or part of the person's body) comes within a predetermined proximity zone 302 of the UE 304. The proximity zone can be determined by testing of the particular device or device type, or can be a standardized distance. In an embodiment, the proximity zone can be a function of a power output (max or average) of the device, the geometry/configuration of the proximity sensor and/or mobile device 304, as well as other relevant factors.

In an embodiment, the proximity sensor can indicate when all or a portion of the object 306 is within the zone. The indication can be binary e.g., the object is either in or outside of the zone 302. In this embodiment, the device can proceed with reducing the power to the mobile device 304 as a function of the duty cycle when the object 306 is within the zone 302, or not reduce the power, regardless of the duty cycle when the object 306 is not within the zone 302.

In another embodiment, the proximity sensor on device 304 can determine a distance of the object from the proximity zone 302 or from the device 304, and send a signal to a controller on the device indicating the distance. The device 304 can thus reduce the power as a function of the distance as well as a function of the duty cycle. For example, for a given duty cycle, the device can reduce the power by X if the object is Z distance from the device 304. If the object 306 moves closer and is Z/2 distance from the device 304, then the power can be reduced by 2× or 4×, or whatever scaling is appropriate in order to keep RF energy transmitted by the device 304 within the MPE.

Turning now to FIG. 4, illustrated is an example table 400 showing uplink formats and slot assignments in accordance with various aspects and embodiments of the subject disclosure.

It is to be appreciated that table 400 is just an exemplary table. In some embodiments, and according to 3GPP standards, there can be up to 56 different slot formats and up to 14 or more difference subcarrier symbols per slot, while table 400 depicts just 7 slot formats and 7 subcarrier symbols.

In an embodiment, the base station (e.g., network node 106 or GNB 202) can transmit downlink control information to the UE device scheduling one or more data channels. The DCI can also include an indicator of the type of format (e.g., Format 0-6) so that the UE device knows when to transmit and when to receive a transmission from the network node. The UE device can use the format indicated in order to determine the magnitude of the power backoff. For instance, slot 402 has all downlink symbols, and so the UE will only receive transmissions during the time period, while slot 404 is the reverse, and only will transmit during this time. The power backoff associated with an indication of format 1 with slot 404 will thus be the largest magnitude power reduction. By contrast, slot 406 has 4 downlink subcarrier symbols and 3 uplink subcarrier symbols for a duty cycle of 3:4 (e.g., ~43% of the time the UE will be transmitting). Similarly, 408 has 5 uplink symbols and 2 downlink symbols for a duty cycle of 5:2 (e.g., ~71%). The power reduction for 408 will thus be larger than the power reduction for 406, but smaller than the power reduction for 404.

Figure 5:
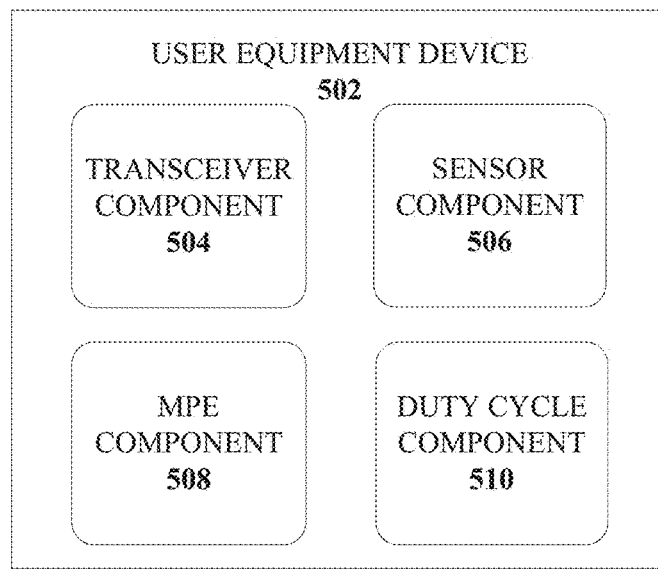
FIG. 5 illustrates an example block diagram of a user equipment device in accordance with various aspects and embodiments of the subject disclosure.

Turning now to FIG. 5, illustrated is an example block diagram 500 of a user equipment device 502 in accordance with various aspects and embodiments of the subject disclosure In an embodiment, the transceiver component 504 can receive from a network node device a downlink control transmission comprising downlink control information indicating a slot format for a subsequent time period. The duty cycle component can determine from the indicated slot format what the duty cycle of the subsequent time period will be, and then the MPE component 508 can be configured to determine an appropriate power reduction based on the duty cycle, if the sensor component 506 determines that an object or person is within a predetermined distance of the UE device 502. The MPE component 508 can also determine how much to reduce the power by based on other factors like the baseline transmit power, the geometry of the phone, SAR testing performed with the UE device 502 and other factors.

In other embodiments, the MPE component 508 can scale the power reduction based on the distance of the object as determined by the sensor component 506. The duty cycle component 510 can also determine what the future uplink demands may be, and the transceiver component 504 can communicate the expected uplink requirements to the network node device via RRC signaling.

Figure 6:
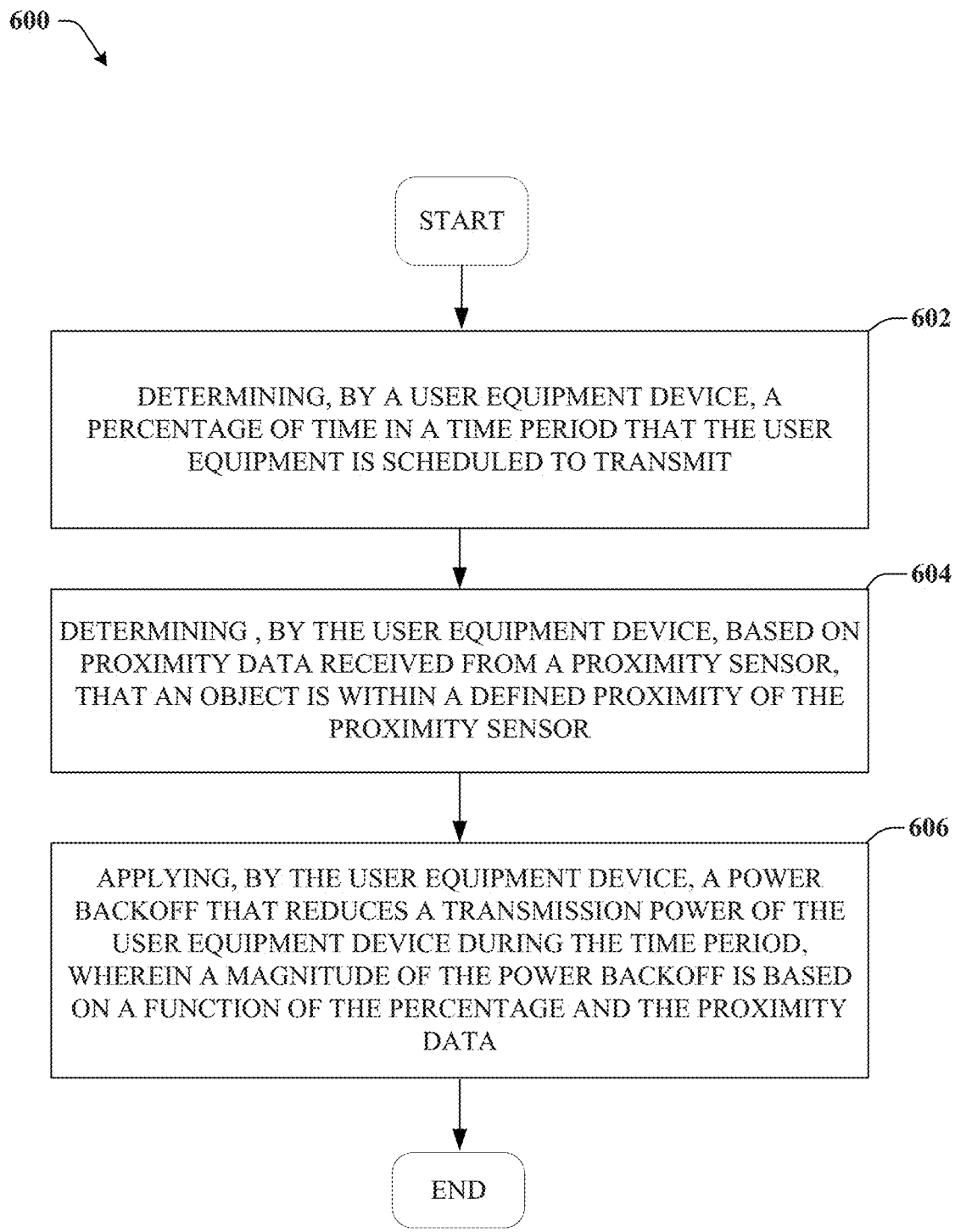
FIG. 6 illustrates an example method for reducing the power of an uplink transmission based on duty cycle and proximity sensor information in accordance with various aspects and embodiments of the subject disclosure.
Figure 7:
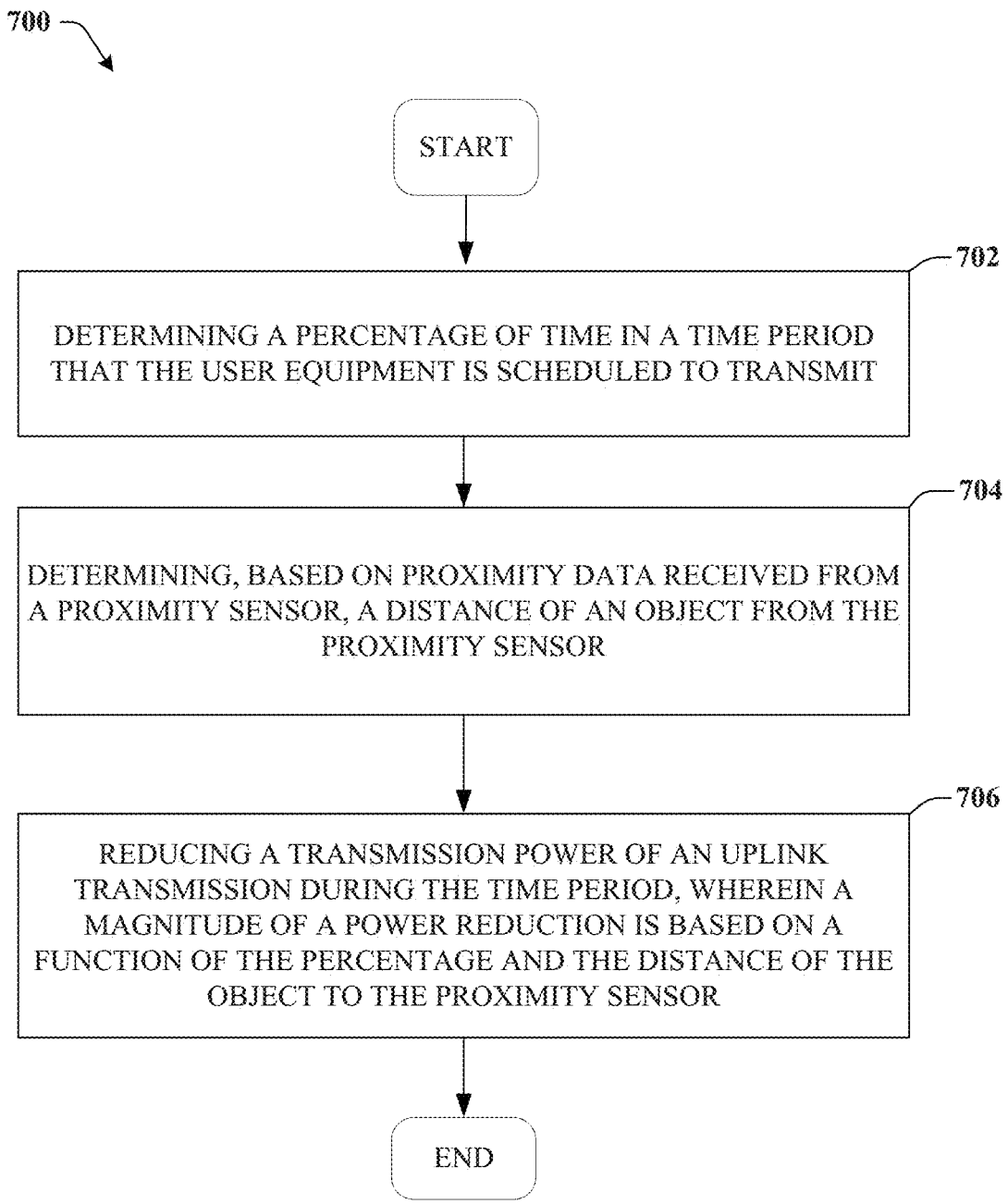
FIG. 7 illustrates an example method for reducing the power of an uplink transmission based on duty cycle and proximity sensor information in accordance with various aspects and embodiments of the subject disclosure.

FIGS. 6-7 illustrates a process in connection with the aforementioned systems. The processes in FIGS. 6-7 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method 600 for reducing the power of an uplink transmission based on duty cycle and proximity sensor information in accordance with various aspects and embodiments of the subject disclosure.

Method 600 can begin at 602 where the method includes determining, by a user equipment device, a percentage of time in a time period that the user equipment is scheduled to transmit.

At 604, the method includes determining, by the user equipment device, based on proximity data received from a proximity sensor, that an object is within a defined proximity of the proximity sensor.

At 606, the method includes applying, by the user equipment device, a power backoff that reduces a transmission power of the user equipment device during the time period, wherein a magnitude of the power backoff is based on the percentage and the proximity data.

FIG. 7 illustrates an example method 700 for reducing the power of an uplink transmission based on duty cycle and proximity sensor information in accordance with various aspects and embodiments of the subject disclosure.

Method 700 can begin at 702 where the method includes determining a percentage of time in a time period that a user equipment is scheduled to transmit.

At 704, the method includes determining, based on proximity data received from a proximity sensor, a distance of an object from the proximity sensor.

At 706, the method includes reducing a transmission power of an uplink transmission during the time period, wherein a magnitude of a power reduction is correlated to the percentage and the distance of the object to the proximity sensor.

Figure 8:
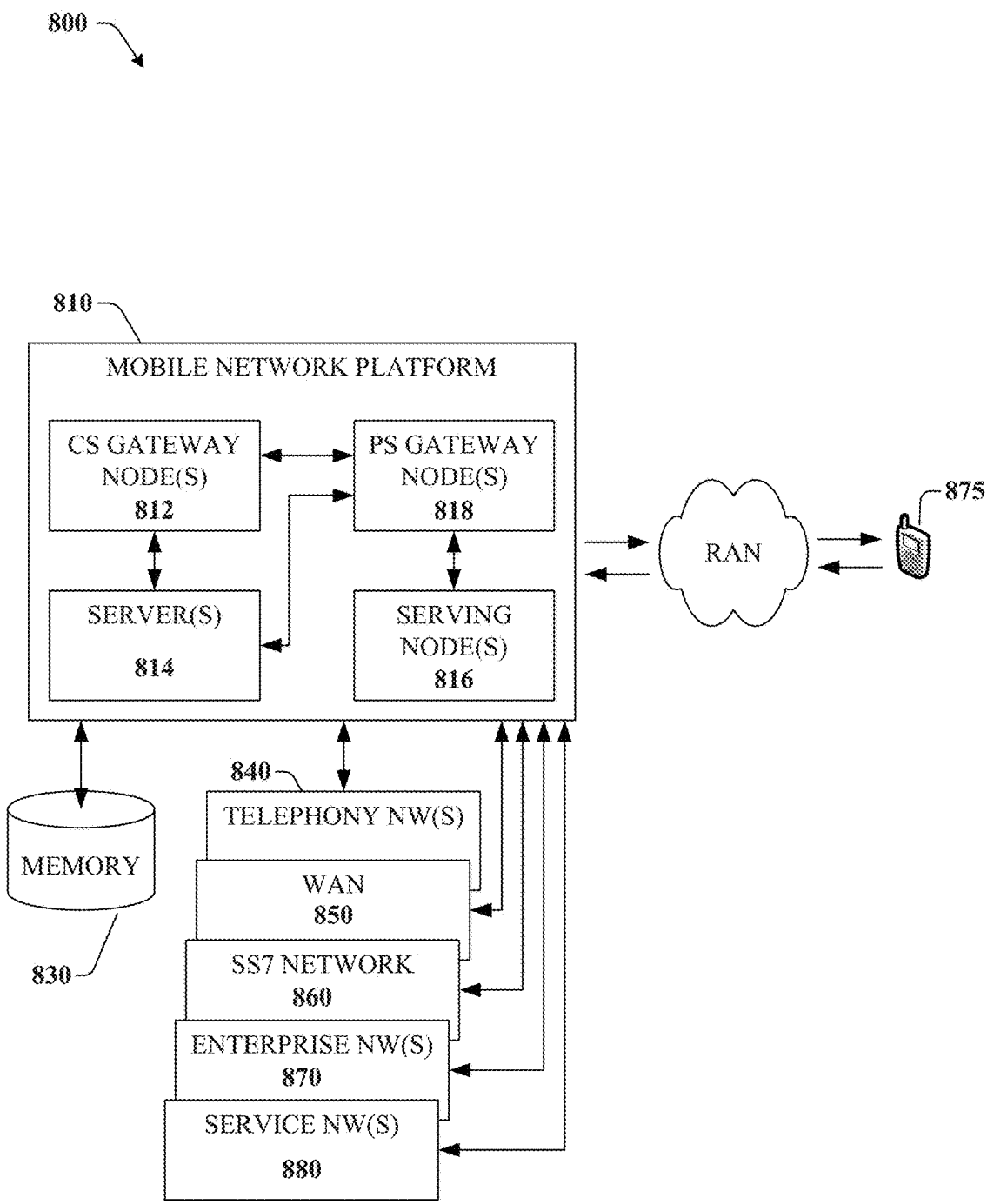
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
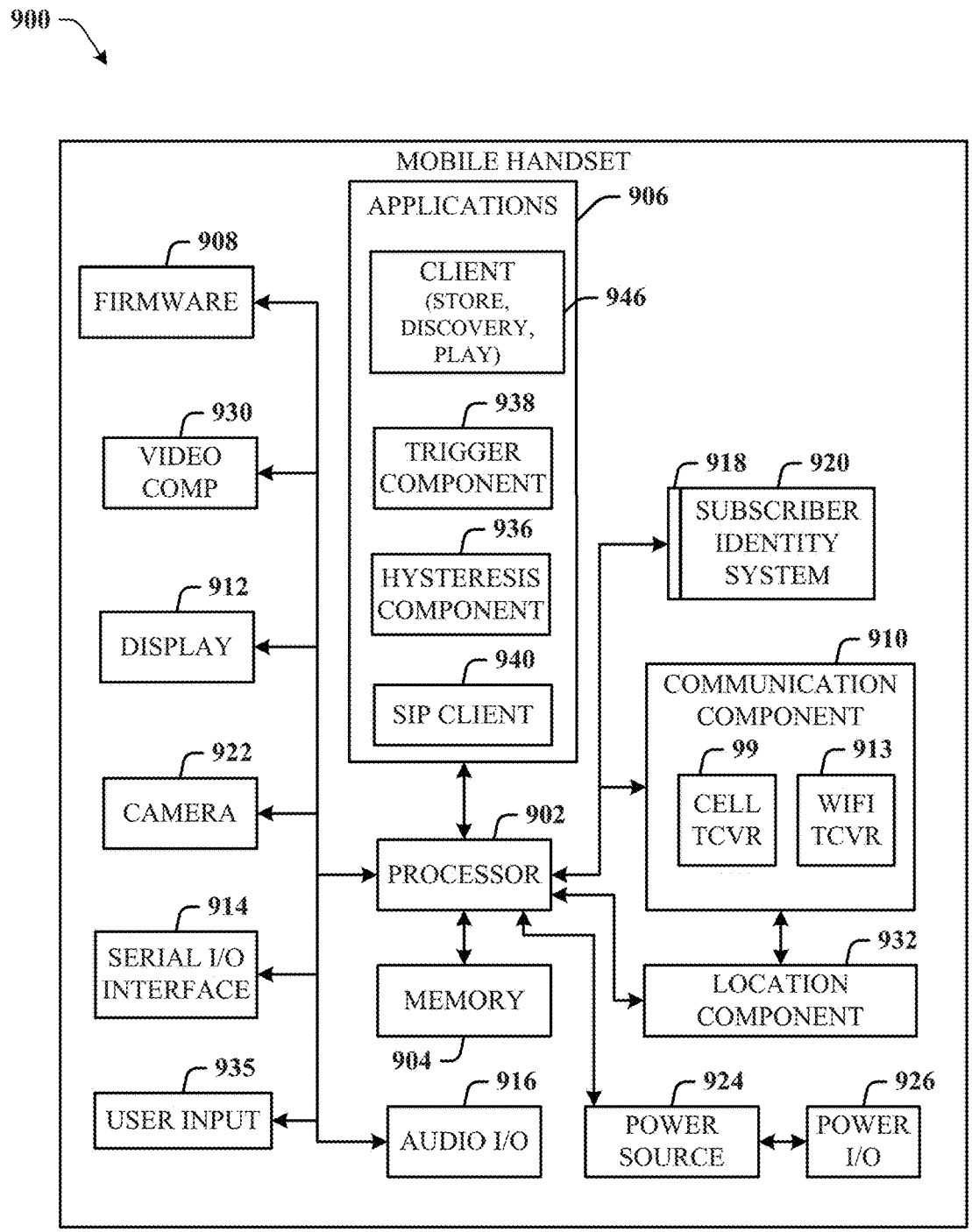
FIG. 9 illustrates an example block diagram of an example user equipment that can be a mobile handset in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
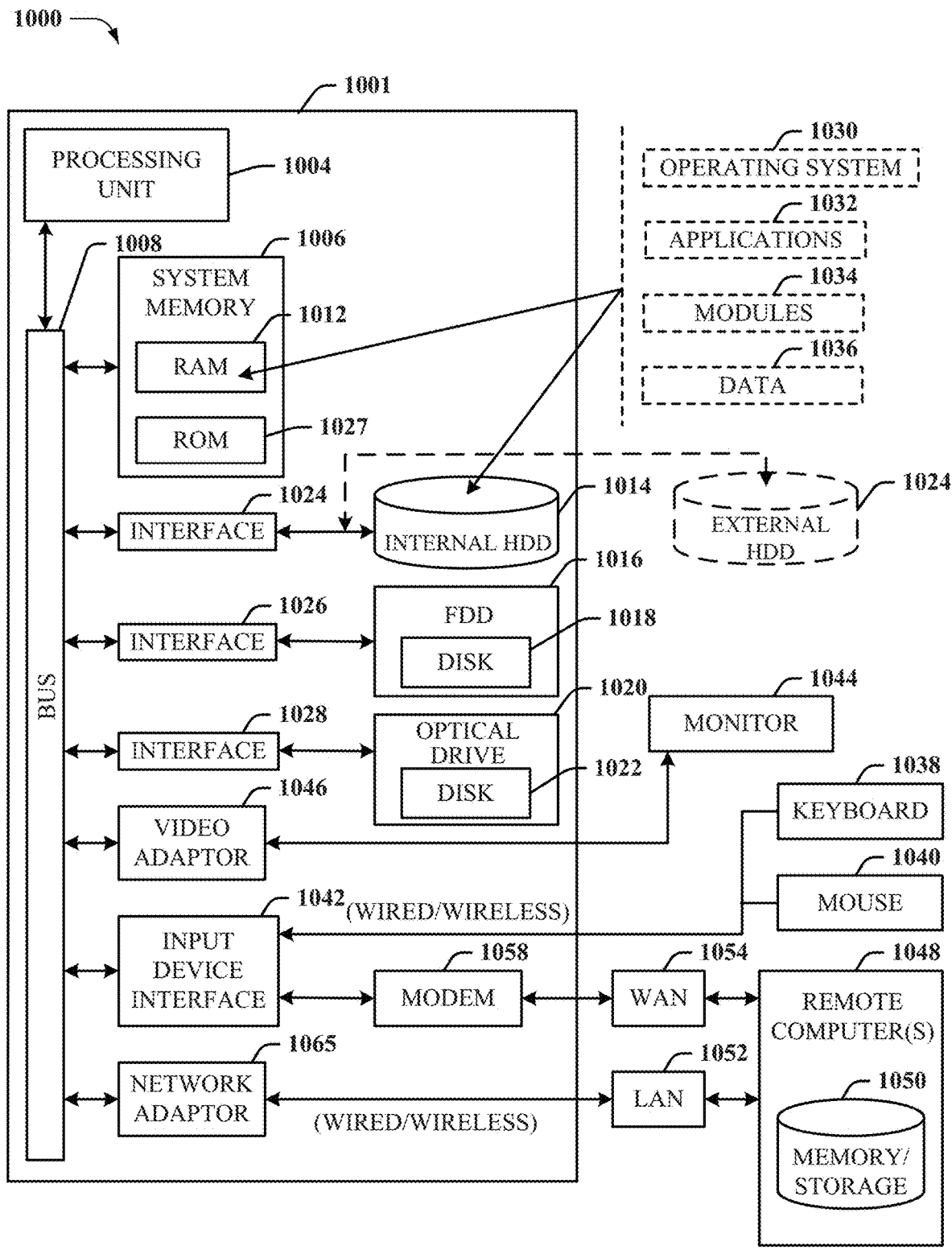
FIG. 10 illustrates an example block diagram of a computer that can be operable to execute processes and methods in accordance with various aspects and embodiments of the subject disclosure

Referring now to FIG. 10, there is illustrated a block diagram of a computer 1000 operable to execute the functions and operations performed in the described example embodiments. For example, a network node (e.g., network node 106, GNB 202, etc.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infra-red and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
    a processor; and
    a memory that stores executable instructions that, when executed by the processor, facilitate performance of operations, comprising:
    determining a duty cycle of a transceiver for a period of time, wherein the duty cycle is a ratio of an uplink transmission time period to a downlink transmission time period;
    determining a proximity zone for the user equipment as a function of a geometric configuration of the user equipment and a proximity sensor of the user equipment;
    receiving proximity data from the proximity sensor, wherein the proximity data indicates that an object is within the proximity zone; and
    applying a power adjustment to reduce a transmission power of an uplink transmission, wherein a magnitude of the power adjustment is a function of the duty cycle and a distance of the object from the proximity sensor as indicated in the proximity data, wherein the magnitude increases as the distance decreases.

2. The user equipment of claim 1, wherein determining the duty cycle is based on downlink control information received from network equipment.

3. The user equipment of claim 2, wherein the downlink control information identifies a slot format for the period of time.

4. The user equipment of claim 1, wherein the operations further comprise:
    transmitting, via a radio resource control message to a network equipment, information indicating a predicted downlink dominant mode based on an application active on the user equipment.

5. The user equipment of claim 1, wherein the power adjustment reduces the transmission power to satisfy a criterion related to exposure to radio frequency energy.

6. The user equipment of claim 1, wherein the operations further comprise determining the distance of the object to the proximity sensor based on the proximity data.

7. The user equipment of claim 1, wherein a first power adjustment associated with the distance being a first distance has a higher magnitude than a second power adjustment associated with the distance being a second distance in response to the second distance being determined to be larger than the first distance.

8. The user equipment of claim 1, wherein a first power adjustment associated with a first duty cycle has a higher magnitude than a second power adjustment associated with a second duty cycle in response to the first duty cycle being larger than the second duty cycle.

9. The user equipment of claim 1, wherein a first power adjustment associated with first proximity data has a higher magnitude than a second power adjustment associated with second proximity data in response to the first proximity data indicating a presence of the object within a defined distance of the proximity sensor, and the second proximity data indicating that the object is not within the defined distance of the proximity sensor.

10. A method, comprising:
    determining, by a user equipment, a percentage of time in a time period that the user equipment is scheduled to transmit;

determining, by the user equipment, a proximity zone for the user equipment as a function of a geometric configuration of the user equipment and a proximity sensor of the user equipment;

determining, by the user equipment, based on proximity data received from the proximity sensor, that an object is within the proximity zone; and applying, by the user equipment, a power backoff that reduces a transmission power of the user equipment during the time period, wherein a magnitude of the power backoff is a function of the percentage and a distance of the object from the proximity sensor as indicated in the proximity data, wherein the magnitude increases as the distance decreases.

11. The method of claim 10, wherein determining the percentage is based on downlink control information received from network equipment.

12. The method of claim 11, wherein the downlink control information comprises information associated with a slot format for the time period.

13. The method of claim 10, further comprising:
transmitting, by the user equipment, information indicating a predicted percentage based on an application active on the user equipment.

14. The method of claim 10, further comprising determining the distance of the object to the proximity sensor based on the proximity data.

15. The method of claim 10, wherein a first power backoff associated with the distance being a first distance has a higher magnitude than a second power backoff associated with the distance being a second distance in response to the second distance being determined to be larger than the first distance.

16. A non-transitory machine-readable storage medium, comprising executable instructions that, when executed by a processor of a relay node device, facilitate performance of operations, comprising:

determining a percentage of time in a time period that a user equipment is scheduled to transmit;

determining a proximity zone for the user equipment as a function of a geometric configuration of the user equipment and a proximity sensor of the user equipment;

determining, based on proximity data received from the proximity sensor, that an object is within the proximity zone; and reducing a transmission power of an uplink transmission during the time period, wherein a magnitude of a power reduction is a function of the percentage and a distance of the object to the proximity sensor indicated in the proximity data, wherein the magnitude is inversely proportional to the distance.

17. The non-transitory machine-readable medium of claim 16, wherein the operations further comprise:
transmitting, to network equipment, information indicating a predicted percentage based on an application active on the user equipment.

18. The non-transitory machine-readable medium of claim 16, wherein the determining the percentage is based on downlink control information received from network equipment.

19. The non-transitory machine-readable medium of claim 18, wherein the downlink control information comprises information associated with a slot format for the time period.

20. The non-transitory machine-readable medium of claim 16, wherein the operations further comprise determining the distance of the object to the proximity sensor based on the proximity data.

* * * * *